United States Patent [19]
Pflanz

[11] 3,829,707
[45] Aug. 13, 1974

[54] GAS INSULATED HIGH VOLTAGE ELECTRICAL TRANSMISSION LINE WITH MEANS FOR DAMPING TRANSIENTS

[75] Inventor: Herbert M. Pflanz, Westwood, Mass.

[73] Assignee: Allis-Chalmers Corporation, Milwaukee, Wis.

[22] Filed: Feb. 9, 1973

[21] Appl. No.: 331,215

[52] U.S. Cl. .............. 307/147, 174/28, 174/126 CP
[51] Int. Cl. ............................................ H01b 7/30
[58] Field of Search ............. 174/28, 126 CP, 16 B; 333/79, 12, 96; 307/147, 148; 317/44, 45, 50

[56] References Cited
UNITED STATES PATENTS

| 863,247 | 8/1967 | Yeatman | 333/79 |
|---|---|---|---|
| 1,307,995 | 6/1919 | Armor | 333/79 |
| 2,879,318 | 3/1959 | Straube | 333/96 |
| 3,541,473 | 11/1970 | Schlicke | 333/12 |
| 3,573,676 | 4/1971 | Mayer | 333/96 |
| 3,652,778 | 3/1972 | Sakai | 174/28 |

Primary Examiner—David Smith, Jr.
Attorney, Agent, or Firm—Robert C. Sullivan

[57] ABSTRACT

A gas insulated electrical transmission line, such as a high voltage transmission line insulated by $SF_6$ (sulphur hexafluoride) gas, in which the conductor member is enclosed in a grounded metal sheath filled with an insulating gas, and in which the transmission line conductor member is coated for at least part of its length with a thin coating or skin of a material, such as iron, which has a low skin depth in the frequency range of the undesirable electrical transients which it is desired to damp or attenuate. For example, the skin of iron may typically have a radial thickness of 0.01 mm. The inner conductor member to which the coating is applied should be of a material such as aluminum or copper which is a good electrical conductor and which has a large skin depth at the normal power frequency far below the frequency range of the electrical transients which the outer skin is to damp or attenuate.

16 Claims, 3 Drawing Figures

PATENTED AUG 13 1974    3,829,707

GAS INSULATED HIGH VOLTAGE ELECTRICAL TRANSMISSION LINE WITH MEANS FOR DAMPING TRANSIENTS

BACKGROUND OF THE INVENTION

1. Field of the Invention

This invention relates to electrical conductors or electrical transmission lines which have good conductive characteristics for low frequency electrical phenomena, but which present a resistance path for attenuating or damping high frequency or high rate of change phenomena such as switching transients, traveling waves, and lightning surges, and more particularly the invention relates to a gas insulated electrical transmission line, such as an $SF_6$ gas insulated transmission line, which satisfies the foregoing requirements.

2. Description of Prior Art

When a circuit breaker is closed to energize or reclose a high voltage transmission line, voltage surges of relatively high magnitude and high frequency may be produced. This problem is particularly acute in the example of a switching operation when energizing a capacitor bank. On prestriking, traveling waves are generated which typically are amplified at a cable line junction and again at a transformer terminal, producing end-of-the-line overvoltages, of, for example, several times normal crest voltage. High magnitude, high frequency voltage surges also occur on a transmission line when lightning strikes the line or strikes equipment connected to the line.

The high frequency transients of the type which might occur on a high voltage transmission line may have frequencies, for example, anywhere in the range from above 1 kilohertz to the order of magnitude of 1 megahertz (i.e. from above 1,000 cycles/sec. to the order of magnitude of 1,000,000 cycles/sec).

One well-known method of reducing the magnitude of switching surges is to preinsert a resistance of suitable value into the circuit during the closing operation just prior to the moment at which the main contacts engage. Other methods have involved the use of parallel surge-modifying capacitances in parallel with the transformer terminals; and a third prior art method of attenuating the undesirable high frequency transients in a transmission line or the like has been the use of series inductances in the line. These prior art methods just briefly discussed are costly. Typically, the resistor insertion method mentioned requires the use of expensive and elaborate separate switching means for the insertion of the resistor.

It is also known to utilize conductor arrangements for attenuating undesirable high frequency transients which operate upon the principle that high frequency currents tend to flow substantially only in the radially outer peripheral portion of the conductor due to the well-known "skin effect" principle. Prior art teachings of high frequency transient attenuation which show utilization of the skin effect principle include U.S. Pats. No. 3,480,832 issued to Herman R. Person; No. 3,531,264 issued to Herman R. Person; No. 3,541,473 issued to Heinz M. Schlicke et al.; and No. 3,543,105 issued to Robert I. Van Nice.

A literature reference relating to a utilization of the skin effect principle for attenuation of high frequency harmonics is provided in an article entitled "High Frequency AC Harmonics on a HVDC Transmission Line Might Be Attenuated by Conductor Design" by John R. Abbott, published in the periodical "Transmission and Distribution," August, 1969, pages 58–60, inclusive.

SUMMARY OF THE INVENTION

It is an object of the present invention to provide an improved electrical conductor arrangement which is a good conductor for low frequencies such as 50 or 60 Hertz but which presents a substantial resistance for high frequency phenomena such as switching transients and traveling waves.

It is another object of the invention to provide a gas insulated electrical transmission line or the like, such as a transmission line insulated by $SF_6$ gas, which attenuates or damps high frequency electrical phenomena such as switching transients and traveling waves but which presents a good conductive path for low frequencies such as 50 or 60 Hertz (50 or 60 cycles/sec.) and which permits the realization of substantial savings in the installation and/or operation of the gas-filled transmission line.

In achievement of these objectives, there is provided in accordance with an embodiment of the invention a gas insulated electrical transmission line, such as a high voltage transmission line insulated by $SF_6$ (sulphur hexafluoride) gas, in which the conductor member is enclosed in a grounded metal sheath filled with an insulating gas, and in which the transmission line conductor member is coated for at least part of its length with a thin coating or skin of a material, such as iron, which has a low skin depth in the frequency range of the undesirable electrical transients which it is desired to damp or attenuate. For example, the skin of iron may typically have a radial thickness of 0.01 mm. The inner conductor member to which the coating is applied should be of a material such as aluminum or copper which is a good electrical conductor and which has a large skin depth in the power frequency range such as 50 or 60 Hertz.

BRIEF DESCRIPTION OF THE DRAWING

Further objects and advantages of the invention will become apparent from the following description taken in conjunction with the accompanying drawing in which.

DESCRIPTION OF THE PREFERRED EMBODIMENT

Figure 1:
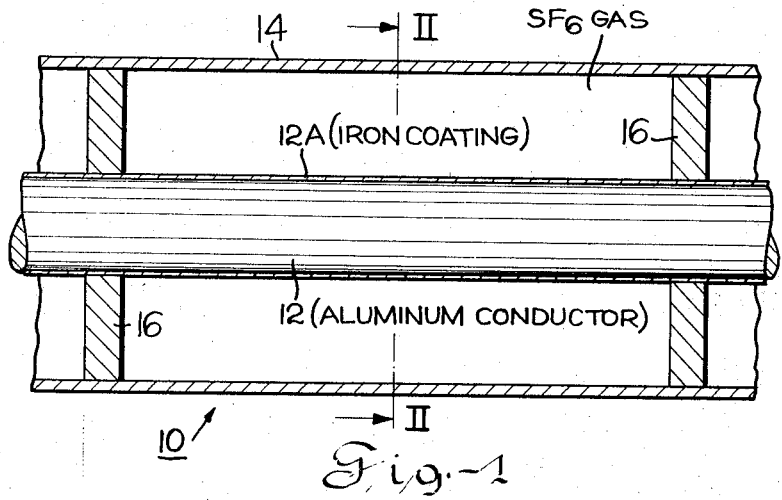
FIG. 1 is a view in longitudinal section of a portion of the length of a gas insulated transmission line in accordance with the invention.
Figure 2:
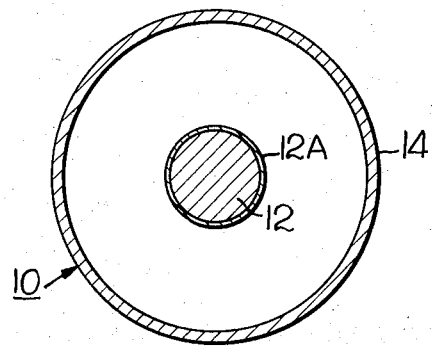
FIG. 2 is a view in transverse section taken along line II—II of FIG. 1.

Referring now to FIGS. 1 and 2, there is shown an embodiment of the invention as incorporated in a gas insulated high voltage transmission line generally indicated at 10. The transmission line 10 would normally be a three-phase transmission line either with three conductors within a single housing, or, alternatively, three isolated single phase buses, each in a separate housing. Conductor 12 represents one isolated single phase of the three-phase line, the single phase having a separate housing. In such a transmission line, the normal voltage transmitted may be of the order of magnitude of 700 kilovolts phase-to-ground, for example. The transmission line comprises the conductor member 12 of aluminum coaxially positioned within a cylindrical hollow electrically conductive metal sheath member 14. Sheath 14 is grounded.

While conductor 12 has been shown and described as being made of aluminum, it could be made of copper or other suitable material of good electrical conductivity and, like aluminum, having a large skin depth at normal power frequencies such as 50 or 60 Hertz.

The conductor 12 is supported at spaced intervals by insulating discs such as those indicated at 16 which are located at axially spaced locations along the hollow interior of sheath member 14. The hollow interior of sheath 14 is filled with an insulating gas, preferably $SF_6$ (sulphur hexafluoride). The periphery of the conductor member 12 is coated along the entire surface thereof and for at least a portion of the length of transmission line 10 with a coating 12A of a low skin depth material such as a skin of iron of typically 0.01 millimeter radial thickness. As is well known, the skin depth at a given frequency depends upon the material and varies with different materials. In this connection, reference is made to the "Encyclopedia of Physics", Rheinhold Publishing Corp., 1966, which gives the following formula for skin thickness:

$$\delta = (2/\Sigma\omega\mu)^{1/2}$$

where: $\delta$ is "skin thickness" and corresponds to the distance from the surface in which the current density drops to $1/\epsilon$ of its value at the surface, where $\epsilon$ is the number 2.7182818+ (the base of the natural system of logarithms); $\Sigma$ is the conductivity of the material; $\mu$ is the permeability of the material; $\omega$ is the frequency.

For a comprehensive discussion of skin effect, reference is also made to the publication "Reference Data For Radio Engineers", Fourth Edition, 1956, second printing 1957, published by International Telephone and Telegraph Corporation, (See chapter 5, pages 128–132, inclusive).

In the drawing, the relative thickness of the iron coating 12A is greatly exaggerated for clarity of the drawing. This skin of iron on the exterior periphery of the aluminum conductor 12 will for all practical purposes have little or no effect on the current flowing at normal power frequencies such as 50 or 60 Hertz (50 or 60 cycles per second). However, as previously explained, the skin effect principle will cause any high frequency transient currents to flow substantially only in the outer skin 12A of the conductor 12 where the presence of the iron skin will increase the resistance by a factor of ten to currents flowing at 1 megahertz (1,000,000 cycles/sec.) as compared to the resistance of an uncoated aluminum conductor at the same frequency. The resistance of the uncoated aluminum conductor at 1 megahertz would be approximately 1,000 times the resistance of the same uncoated aluminum conductor at 60 Hertz.

Figure 3:
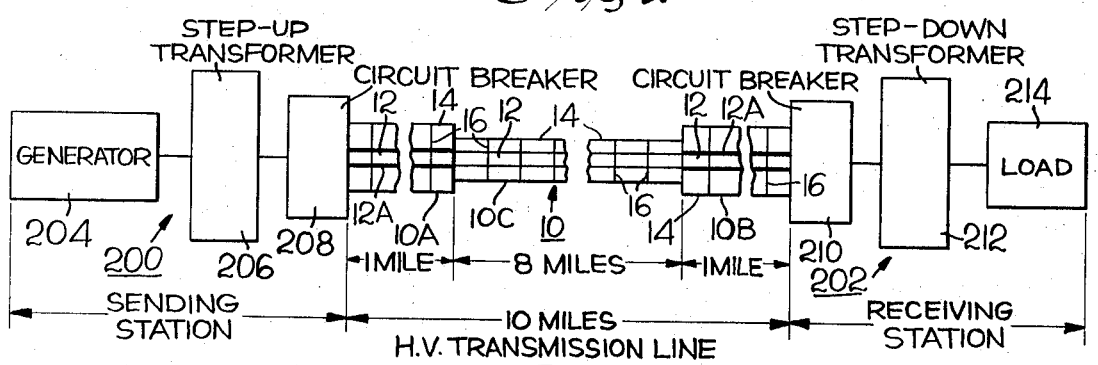
FIG. 3 is a diagrammatic view of a typical gas-filled transmission line in accordance with the invention connected at one end thereof to a sending or generating station and at the opposite end thereof to a receiving or load station.

Referring now to FIG. 3, there is diagrammatically shown the electrical transmission line generally indicated at 10 of the $SF_6$ gas insulated type shown in FIGS. 1 and 2, and connected at one end to a sending or generating station generally indicated at 200 and at its opposite end to a receiving or load station generally indicated at 202. The transmission line 10 is assumed to be 10 miles long. The sending or generating station includes a generator 204, a step-up transformer 206, and a circuit breaker 208. The load station includes a circuit breaker 210, a step-down transformer 212, and a load 214.

In the typical embodiment shown in FIG. 3, the $SF_6$ insulated transmission line 10 includes a portion 10A extending for example, for the first mile from the sending or generating station, the conductor 12 in the transmission line portion 10A being provided with a thin skin 12A of iron or other suitable low skin depth material for attenuating the high frequency transients, as previously described and shown in connection with FIGS. 1 and 2; and, similarly, the conductor 12 in the first mile, for example, of the transmission line from the receiving or load station 200, indicated at 10B, is also provided with a thin skin of iron or other suitable low skin depth material for attenuating high frequency transients in the same manner as for section 10A. The conductor 12 in the intermediate portion 10C of the transmission line, and extending for eight miles in the assumed example, is not coated with the low skin depth material 12A.

Due to the provision of the high frequency transient attenuating coating 12A on the conductor 12 of portion 10A of the transmission line, if lightning should strike the sending or generating station 200 and enter the transmission line from the generator end, the surge voltage along the transmission line caused by the lightning stroke would be substantially fully attenuated by the end of the first mile from the sending or generating station; similarly, if lightning should strike the receiving or load station 202 and enter the transmission line from the load end 202, the surge voltage along the transmission line caused by the lightning stroke would be substantially fully attenuated by the end of the first mile from the load end, due to the provision of the coating 12A on the conductor 12 of portion 10B of the transmission line 10. Due to the substantial attenuation of surge voltages due to lightning striking either the sending or generating station 200 or the receiving or load station 202 as just described, the intermediate section of the transmission line indicated at 10C and extending for eight miles in the assumed example, can be insulated for substantially lower voltages than the insulation provided for the end sections 10A and 10B of the transmission line, due to the fact that high transient voltages have been substantially attenuated by the time they reach intermediate section 10C. This lower insulation in the intermediate section 10C may assume the form of making the inner and outer diameters of the metal sheath 14 substantially less along the eight-mile length of section 10C than along the transmission line sections 10A and 10B as shown in FIG. 3, with the result that a lower volume of insulating gas is interposed per unit length of the transmission line between the center conductor 12 and the grounded outer sheath 14 along the intermediate section 10C than along transmission line sections 10A and 10B. The reduced diameter of the metal sheathing along intermediate section 10C also results in a saving on the metal sheathing. Alternatively, the diameter of the sheath 14 may be the same in intermediate transmission line section 10C as in the end sections 10A and 10B, but instead the pressure and density of the insulating gas, such as the $SF_6$ gas, may be made substantially lower in the intermediate section 10C than in the end sections 10A and 10B by suitably isolating the gas in the various sections 10A, 10B, 10C; or, a combination of the two alternative arrangements for reducing insulation in the intermediate section 10C may be used.

In any of these alternatives made possible by the invention, a substantial cost saving can be effected as compared to prior art $SF_6$ insulated cables which do not have the high frequency transient attenuation arrnagement of the invention.

Due to the fact that the transmission line 10 is provided with the grounded metal sheath 14 along its entire length, a lightning stroke anywhere along the 10 mile length of the transmission line will not cause a voltage surge on the transmission line, and only a lightning stroke at the sending or generating station 200 or at the receiving or load station 202 will cause a lightning-produced surge voltage to enter the transmission line.

Instead of using iron as the coating 12A on the center conductor 12, as shown and described hereinbefore, the thin coating of low skin depth material may be some other material preferably having high permeability, high resistance characteristics, such as various nickel-iron alloys, known as "Permalloys" wherein the basic nickel-iron alloy may be varied to include chromium, copper, or molybdenum, as desired, as set forth in U.S. Pat. No. 3,541,473 to Heinz M. Schlicke et al. Other materials which may be used for the thin coating 12A on the conductor 12 include the following: (1) lead; (2) tin; (3) fibre metal; (4) foam metal.

Reference is made to the textbook "Electrical Shock Waves in Power Systems" by R. Ruedenberg, Harvard Press, Cambridge, Massachusetts, 1968 (See page 12) at which the equation is given for the attenuation of a voltage pulse along a transmission line due to the resistance of the conductor alone, as follows:

$$e = e_o \exp[(-\tfrac{1}{2}(r/z)x)]$$

where:
  $r$ is line resistance per Km. length;
  $x$ is line length in Km.
  $z$ is surge impedance (for $SF_6$ line, surge impedance is approximately 70 ohms).

Consider that it is desirable that any voltage pulse on this transmission line should be attenuated to one-half of its value when it has traveled a distance X=1Km. What resistance value $r$ per Km. is required?

Using the equation:
  $e/e_o = \tfrac{1}{2} = \exp[-\tfrac{1}{2}(r/z)x]$
  or $\log 2 = \tfrac{1}{2}(r/z)x = \tfrac{1}{2}(r/70)x \cdot 1$
  $r = 0.7 \times 2 \times 70 = 100$ ohms/Km.

Such a resistance can be materialized (due to the skin effect of high frequency transients flowing in low skin depth material) if one considers the high rate of change associated with a traveling wave.

It can be shown, for example, that with a 5 cm. diameter (radius = 25mm.) conductor with a skin of iron of 0.01 mm. that the required resistance of 100 ohms/Km. can be obtained at a skin depth of $6.4 \times 10^{-3}$ mm. and at a transient frequency of $0.3 \times 10^6$ hertz, utilizing the following equations:
  1. $\Sigma = 10$ (m/$\Omega$mm$^2$)
  2. $d = 1/\Sigma 2\pi r(R/l)$
  3. $f = 2/\Sigma 2\pi \mu d^2$
where in equations (1), (2), (3):
  $\Sigma$ = conductivity
  $d$ = skin thickness in mm.
  $r$ = radius of the conductor in mm.
  $R/l$ = resistance in ohms per meter at the assumed transient frequency
  $f$ = frequency of transient
  $\mu$ = permeability
  $\Omega$ = ohms Thus, a traveling wave with a rise of the wave front to a peak value equal to or corresponding to the first quarter of one cycle of a 300 KHz sine wave would be reduced to one-half its original value after traveling for only 1 Km.

From the foregoing detailed description of the invention, it has been shown how the objects of the invention have been obtained in the preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A high voltage transmission line for normally transmitting electricity in the power frequency range, said transmission line being adapted to be connected at one end thereof to a sending station and at an opposite end thereof to a receiving station, said transmission line comprising a grounded hollow electrically conductive sheath extending substantially the entire length of said transmission line, an electrical conductor of good electrical conductive properties in the power frequency range positioned within said sheath in spaced relation to the inner wall surface of said sheath, said conductor being coated on the outer surface thereof for a first portion of the length of said transmission line which extends a predetermined distance from said one end of said transmission line and for a second portion of the length of said transmission line which extends a predetermined distance from said opposite end of said transmission line with a transient attenuating coating material which substantially attenuates electrical transients having a frequency or rate of change substantially higher than said power frequency range, said transmission line including an intermediate portion extending from said first portion to said second portion, said electrical conductor not being coated with a transient attenuating coating material along said intermediate portion of said transmission line, and an insulating gas in said sheath between said electrical conductor and the inner surface of said sheath in both said first and second portions and in said intermediate portion, said electrical transmission line having substantially greater insulation and thus higher dielectric strength between said electrical conductor and said sheath in said first and said second portions of the length of said transmission line than in said intermediate portion of the length of said transmission line.

2. A high voltage transmission line as defined in claim 1 in which the lower dielectric strength of said intermediate portion is due to lower density of the insulating gas in said intermediate portion than in said first and second portions.

3. A high voltage transmission line as defined in claim 1 in which the lower dielectric strength of said intermediate portion is obtained by using the same insulating gas density in said intermediate portion as in said first and second portions but providing a smaller internal sheath diameter in said intermediate portion than in said first and second portions.

4. A high voltage transmission line as defined in claim 1 in which the lower dielectric strength of said intermediate portion is obtained by the combined effect of (1) a lower density of insulating gas in said intermediate portion than in said first and second portions; and (2) also using a smaller internal sheath diameter in said intermediate portion than in said first and second portions.

5. A high voltage transmission line as defined in claim 1 in which said coating material has a low skin depth at the frequency range of the electrical transients which are to be attenuated.

6. A high voltage transmission line as defined in claim 1 in which said conductor has a large skin depth at normal power frequencies and said coating material has a low skin depth at the frequency range of the electrical transients which are to be attenuated.

7. A high voltage transmission line as defined in claim 1 in which said coating material has a high permeability characteristic.

8. A high voltage transmission line as defined in claim 1 in which said conductor is chosen from the group comprising aluminum and copper.

9. A high voltage transmission line as defined in claim 1 in which said coating material is iron.

10. A high voltage transmission line as defined in claim 1 in which said insulating gas is $SF_6$ (sulphur hexafluoride).

11. A high voltage transmission line as defined in claim 1 in which said coating material is chosen from the group comprising: (1) iron; (2) a nickel-iron alloy; (3) lead; (4) tin; (5) fibre metal; (6) foam metal.

12. A high voltage transmission line for normally transmitting electricity in the power frequency range, said transmission line being adapted to be connected at one end thereof to a sending station and at an opposite end thereof to a receiving station, said transmission line comprising a grounded hollow electrically conductive sheath extending substantially the entire length of said transmission line, an electrical conductor positioned within said sheath in spaced relation to the inner wall surface of said sheath, said conductor having good electrical conductive properties in the power frequency range, said conductor being coated on the outer surface thereof for a first portion of the length of said transmission line which extends a predetermined distance from said one end of said transmission line and for a second portion of the length of said transmission line which extends a predetermined distance from said opposite end of said transmission line with a transient attenuating coating material in the form of a thin coating of a material selected from the group comprising: (1) iron, (2) a nickel-iron alloy, (3) lead, (4) tin, (5) fibre metal, and (6) foam metal, which coating substantially attenuates electrical transients having a frequency or rate of change substantially higher than said power frequency range, said transmission line including an intermediate portion extending from said first portion to said second portion, said electrical conductor not being coated with a transient attenuating coating material along said intermediate portion of said transmission line, and $SF_6$ insulating gas in said sheath between said electrical conductor and the inner surface of said sheath in both said first and second portions and in said intermediate portion, said electrical transmission line having substantially greater insulation and thus higher dielectric strength between said electrical conductor and said sheath in said first and said second portions of the length of said transmission line than in said intermediate portion of the length of said transmission line.

13. A high voltage transmission line as defined in claim 12 in which the lower dielectric strength of said intermediate portion is due to lower density of the insulating gas in said intermediate portion than in said first and second portions.

14. A high voltage transmission line as defined in claim 12 in which the lower dielectric strength of said intermediate portion is obtained by using the same insulating gas density in said intermediate portion as in said first and second portions but providing a smaller sheath diameter in said intermediate portion than in said first and second portions.

15. A high voltage transmission line as defined in claim 1 in which said intermediate portion is of substantially greater length than said first portion or said second portion.

16. A high voltage transmission line as defined in claim 12 in which said intermediate portion is of substantially greater length than said first portion or said second portion.

* * * * *